UNITED STATES PATENT OFFICE.

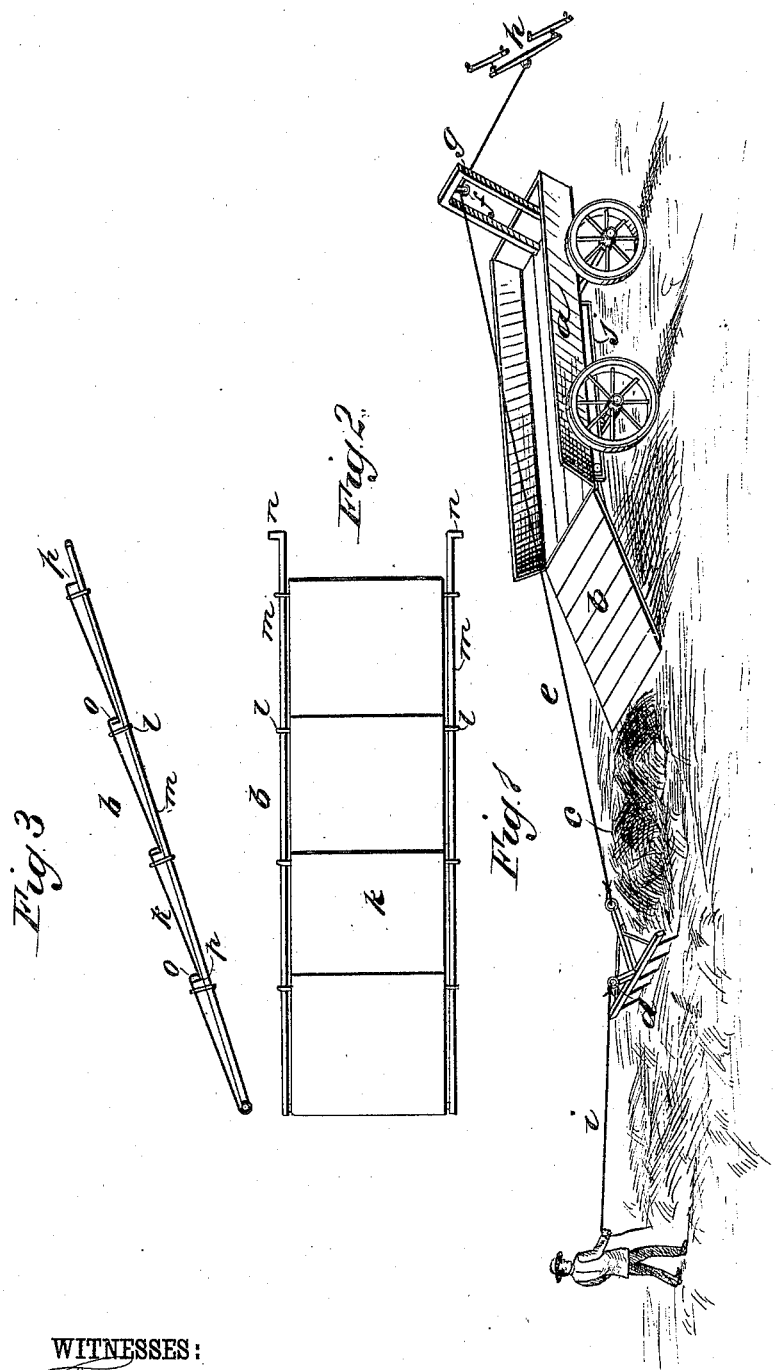

HENRY C. DAVIS, OF WILLOW GROVE, PENNSYLVANIA.

MANURE-LOADER.

SPECIFICATION forming part of Letters Patent No. 301,218, dated July 1, 1884.

Application filed May 6, 1884. (No model.)

*To all whom it may concern:*

Be it known that I, HENRY C. DAVIS, of Willow Grove, in the county of Montgomery and State of Pennsylvania, have invented a new and Improved Manure-Loader, of which the following is a full, clear, and exact description.

My invention consists in a rake, hitching-tackle, and an inclined apron, combined with a wagon in such a manner that horse-power may be utilized in a simple and efficient contrivance for loading manure into the wagon, so as to economize materially in manual labor, as hereinafter described.

Reference is to be had to the accompanying drawings, forming a part of this specification, in which similar letters of reference indicate corresponding parts in all the figures.

Figure 1 is a perspective view of a manure-wagon having my improved contrivances for loading manure by horse-power. Fig. 2 is a detail plan view of the apron. Fig. 3 is a longitudinal section of the same.

At the tail end of the wagon-box $a$, I arrange an inclined apron, $b$, in any approved way suitably for enabling the manure $c$ to be hauled up said apron into the box by a rake, $d$, with a rope, $e$, connected to the rake and extending up over a guide-pulley, $f$, suspended over the front end of the box by an upright frame, $g$, said rope having the whiffletrees $h$, for hitching on a team, attached to the end, and being of suitable length to allow the rake to be drawn back from the rear end of the wagon over the manure to gather its load.

For drawing back the rake conveniently, I hitch a cord, $i$, to the head of the rake, enabling it to be pulled back empty by a man.

I prefer to arrange the apron $b$ to slide under the bottom of the wagon-box on guides $j$, to be kept with the wagon; but it may be detachable from the wagon after the load is obtained, if desired.

The hind end of the wagon-box may be taken out to facilitate the loading with a short apron; but with a longer apron the load may be hauled up over the end of the box. Preferably the telescopic apron shown in Figs. 2 and 3 will be used, which apron I form of sheet metal or other plates, $k$, having hooks or rings $l$, suitably attached at the upper corners of the plates, which hooks or rings are adapted to slide upon side bars, $m$, having outwardly-bent ends $n$. The plates $l$ have their upper ends turned down at $o$ and their lower ends turned up at $p$, as shown, or may have ridges otherwise formed for engagement with each other. The ends $n$ of the rods $m$ are adapted to slide on the guides $j$, the plates $k$ sliding beneath each other. The lower plate $k$ may be secured to the ends of the bars $m$, and the upper plate may be secured to the wagon-body.

The apron and the guide-pulley for the rope may of course be arranged to load over one side of the box; but the best arrangement is substantially as I have represented in the drawings.

It will be readily seen that with this contrivance much of this laborious and disagreeable work as heretofore done may be dispensed with.

Having thus described my invention, I claim as new and desire to secure by Letters Patent—

1. In a device for loading manure upon wagons, the inclined apron $b$, formed of rods $m$, having outwardly-bent ends $n$, adapted to move in the guides $j$ of a wagon, and of the plates $k$, having hooks or rings $l$, and adapted to slide upon the rods $m$, substantially as shown and described.

2. In a device for loading manure upon a wagon, the combination, with the wagon-guides $j$ and the rods $m$, having ends $n$, of the plates $k$, having bent ends or ridges $o$ $p$, and provided with hooks or rings $l$, substantially as shown and described.

3. The combination of an inclined apron, $b$, rake $d$, hauling-rope $e$, and a guide-pulley, $f$, for the rope, with a wagon adapted for utilizing horse-power for loading manure, substantially as described.

4. The combination, with a manure-wagon, of an inclined apron, $b$, adapted for loading manure by hauling it up said apron with a rake, $d$, said apron being arranged on guides $j$ under the box for sliding thereunder to be retained with the wagon when not in use, substantially as described.

5. The combination of an inclined apron, $b$, rake $d$, hauling-rope $e$, and a pulling-back rope, $i$, with a manure-wagon, substantially as described.

HENRY C. DAVIS.

Witnesses:
 JOSEPH W. HUNTER,
 BYRON McCRACKEN.